May 27, 1930.    C. B. DREVITSON    1,760,122
ENGINE PISTON
Filed May 28, 1929    2 Sheets-Sheet 1

Inventor:
Carl B. Drevitson.
by Wright Brown Quimby May
Att'ys.

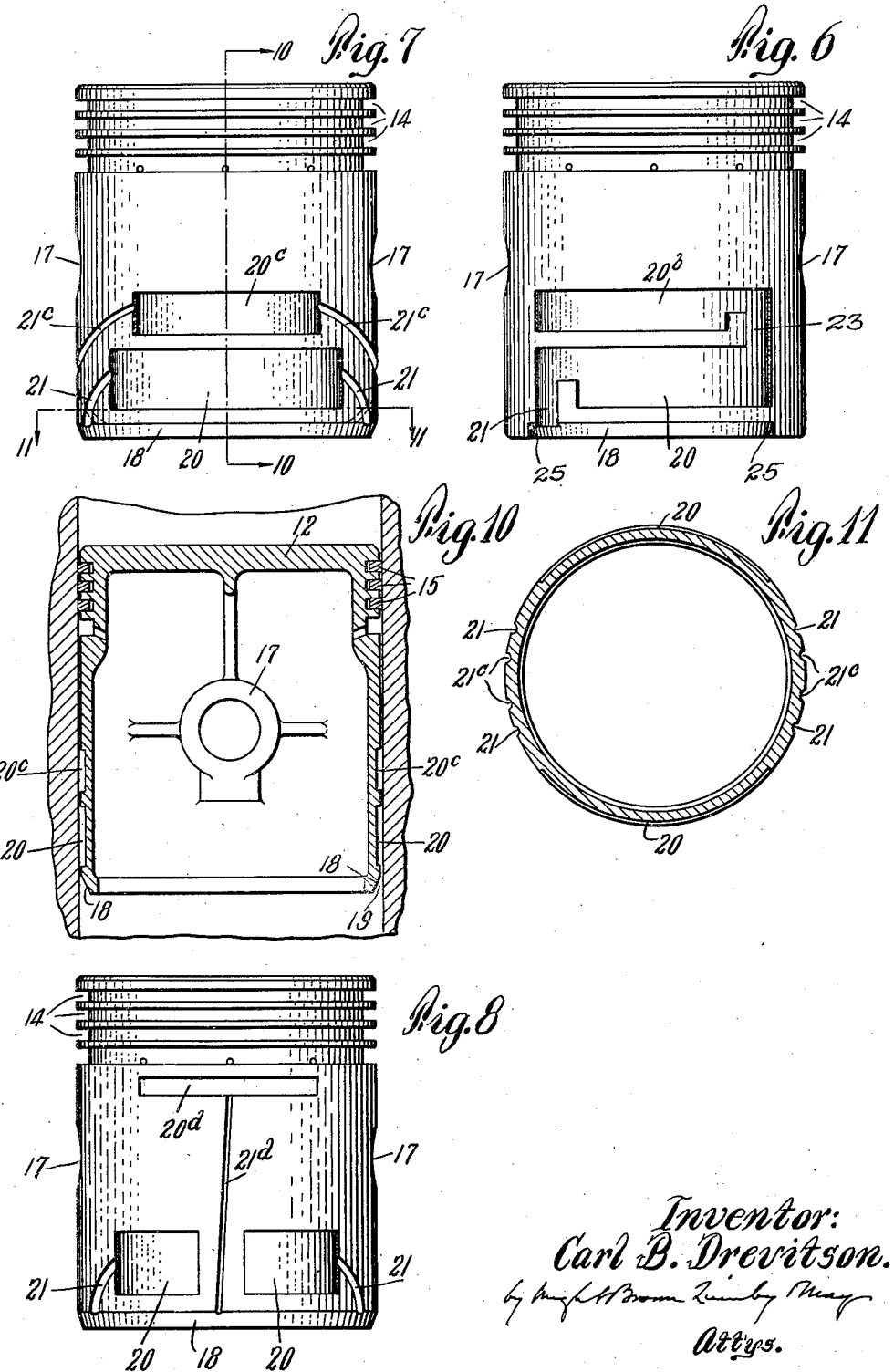

Patented May 27, 1930

1,760,122

UNITED STATES PATENT OFFICE

CARL B. DREVITSON, OF SOMERVILLE, MASSACHUSETTS

ENGINE PISTON

Application filed May 28, 1929. Serial No. 366,611.

This invention relates chiefly to pistons of internal combustion engines, the piston being reciprocated in the bore of a cylinder, and usually comprising a head constituting its outer end, and a cylindrical skirt whose open end constitutes the inner end of the piston.

One object of the invention is to provide the inner end of the piston with means cooperating with the bore of the cylinder during an inward stroke of the piston to accumulate under pressure oil present on the bore of the cylinder and force it between the bore and the periphery of the piston, to prevent objectionable metal contact of the piston with the cylinder, and the noise which often results from such contact, and to ensure sufficient lubrication.

Another object is to provide the piston with additional means cooperating with the bore of the cylinder, whereby a hydraulic cushion of oil is maintained between the piston and bore, to prevent the objectionable noise known as side slap.

Of the accompanying drawings forming a part of this specification,—

Figures 4, 5, 6, 7 and 8 are views similar to Figure 1, showing different embodiments of the invention.

Figure 10 is a section on line 10—10 of Figure 7.
Figure 11 is a section on line 11—11 of Figure 7.

The same reference characters indicate the same parts in all of the figures.

Figure 2:
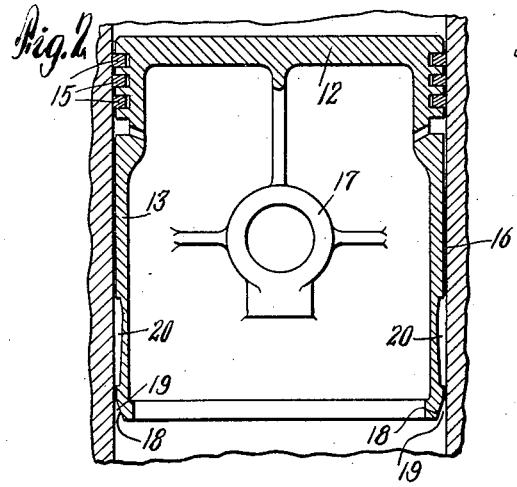
Figure 2 is a section on line 2—2 of Figure 1, and a sectional view of a portion of the cylinder.

The piston shown by the drawings includes a head 12, constituting the closed outer end, and a skirt 13, whose inner end constitutes the open inner end of the piston. The usual grooves 14 adjacent the head, receive expansible piston rings 15, contacting with the bore of the cylinder 16. The skirt is provided with the usual bearings 17 for the connecting-rod wrist-pin. 18 designates a beveled face intersecting the periphery and the inner end of the piston, and preferably constituting a frusto-conical zone at an obtuse angle with the cylindrical periphery of the piston. Said periphery usually has a loose fit in the piston bore, so that the periphery and the cylinder bore are lubricated by oil supplied for that purpose.

The width of the face 18 is preferably about one quarter of an inch when the diameter of the piston is about three and one-half inches. The taper or bevel of said face is preferably as indicated by Figure 2, the lower edge of the face 18 being separated from the cylinder bore by a space of substantial width tapering to the periphery of the piston.

The arrangement is such that the face 18 cooperates with the cylinder bore in forming a tapered oil-receiving throat 19, in which oil is accumulated under pressure during an inward stroke of the piston, and forced outward to form a film filling the crevice between the piston and the cylinder bore. Said film effectively lubricates the surfaces forming the crevice and prevents the objectionable and noisy contact of the piston with the cylinder often observed, particularly after the opposed surfaces have become worn.

To provide a hydraulic cushion of oil between the periphery of the piston and the bore of the cylinder, and thereby eliminate side slap, I form in said periphery a recess 20, spaced from the beveled face 18, and a groove 21, extending from said face to the recess 20. The bottom of the recess is offset inwardly from the periphery of the piston, and the recess is surrounded by said periphery.

The recess 20, and the groove 21, are adapted to cooperate with the cylinder bore in forming an oil pocket and a duct connecting the pocket with the throat 19, the bore forming the outer side of said pocket and duct. The arrangement is such that during an inward stroke of the piston, oil accumulated under pressure in the throat 19, is forced through the duct and is trapped in the pocket to constitute a hydraulic cushion.

Figure 1:
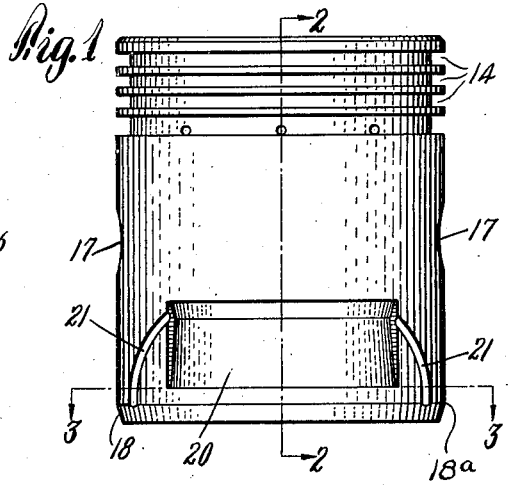
Figure 1 is a side elevation of a piston embodying the invention.
Figure 3:
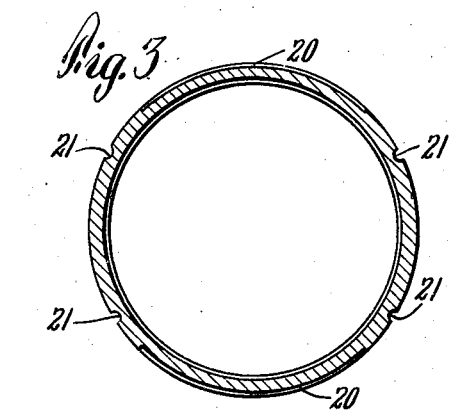
Figure 3 is a section on line 3—3 of Figure 1.

I have thus far described the piston as having a recess 20 and a groove 21. In practice the piston is provided with a plurality of recesses and grooves, and the same may be variously formed and arranged, examples of suitable forms and arrangements being shown by Figures 1, 4, 5, 6, 7 and 8. Figures 1, 2 and 3 show two diametrically opposite recesses 20, and two grooves 21, extending from opposite ends of each recess to the face 18. The grooves open into the upper portion of the recess, so that oil is trapped below the discharge ends of the grooves.

Figure 4:
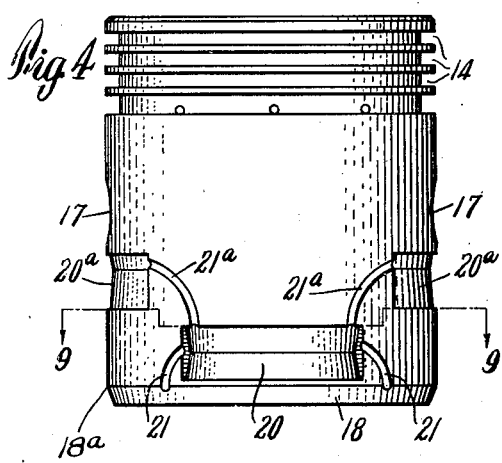
Figure 9:
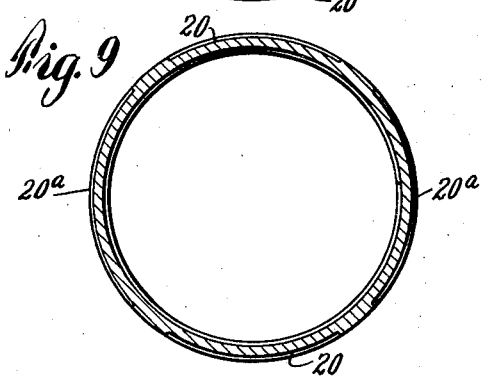
Figure 9 is a section on line 9—9 of Figure 4.

Figures 4 and 9 show additional recesses 20$^a$, above the recesses 20, and grooves 21$^a$ extending from the recesses 20 to the recesses 20$^a$.

Figure 5:
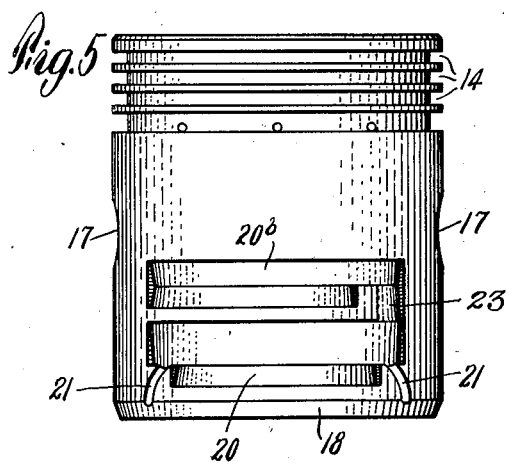

The recess 20 shown by Figures 5 and 6 has an outlet 23 at one end communicating with an outer recess 20$^b$.

Figure 6 shows only one groove 21, communicating with the recess 20.

Figure 7 shows a recess 20$^c$, independent of the recess 20, and grooves 21$^c$ extending between the recess 20$^c$ and the face 18.

The recesses are preferably oblong, their major axes being substantially at right angles with the longitudinal center of the piston, so that the oil pockets are elongated horizontally, or in a direction at right angles with the axis of the piston. The recesses are also preferably located between the bearings 17, and the inner end of the piston, although, as shown by Figure 8, there may be a supplemental recess 20$^d$ between the bearings and the outer end of the piston, and an elongated groove 21$^d$ extending between said recess and the face 18. In this instance, there are two recesses 20, between which the groove 21$^d$ extends.

The inclination of the face 18 relative to the periphery of the piston should be, as above stated, substantially as shown by the drawings. I have found that when the face 18 is so inclined that it is at approximately ten degrees with the periphery of the piston in any longitudinal section thereof, as here shown, the angle 18$^a$ formed by the intersection of said face with the periphery of the cylinder, is sufficiently obtuse to prevent an inward wiping of the oil accumulated by the inward movement of the piston, and create such pressure on the accumulated oil as to force the oil outward into the crevice between the piston and cylinder and into the groove 21.

If the inclination of the face 18 were at approximately forty-five degrees with the periphery of the piston, the less obtuse angle formed by the intersection of said face and periphery would wipe the accumulated oil inwardly lengthwise of the piston during the inward movement of the latter, and would not cause such pressure on the accumulated oil as to adequately force the same outwardly into said crevice and grooves.

The width of the faces 18 should be such that the distance between the receiving mouth of the pocket 19 and the angle 18$^a$ is considerably greater than the width of said mouth, so as shown by Figures 2 and 10.

The inclined face 18 may extend entirely around the piston and form a continuous zone. Said face may, however, be interrupted by shoulders 25 on the periphery of the piston, as shown by Figure 6, said shoulders constituting stops at opposite ends of a segmental inclined face portion 18$^a$, preferably of greater length than the pocket 20. The oil wiped from the cylinder by the face portion 18$^a$, is prevented by the stops 25 from flowing parallel with the inner end of the piston, and is caused to flow only through the groove 21 into a pocket or pockets communicating with said groove, so that an adequate supply of oil enters said pocket or pockets.

It will be understood that when the face is interrupted as shown by Figure 6, there will be a similar interrupted face portion at the opposite side of the piston.

I claim:

1. The combination with an engine cylinder, of a piston having a beveled face intersecting the periphery of the inner end of the piston, a recess in said periphery spaced from said face, and a groove in said periphery extending from the beveled face to the recess, said face, recess, and groove being adapted to cooperate with the bore of the cylinder in forming a tapered oil-containing throat having a receiving mouth, an oil pocket, and a duct connecting the throat with the pocket, the arrangement being such that, during an inward stroke of the piston, oil on the cylinder bore is accumulated under pressure in the throat, forced through the duct, and trapped in the pocket to constitute a hydraulic cushion, whereby side slap is eliminated.

2. The combination with an engine cylinder, of a piston having a beveled face intersecting the periphery of the inner end of the piston, a recess in said periphery spaced from said face, and a groove in said periphery extending from the beveled face to the recess, said face, recess, and groove being adapted to cooperate with the bore of the cylinder in forming a tapered oil-containing throat having a receiving mouth, an oil pocket, and a duct connecting the throat with the pocket, the arrangement being such that, during an inward stroke of the piston, oil on the cylinder bore is accumulated under pressure in the throat, forced through the duct, and trapped in the pocket to constitute a hydraulic cushion, whereby side slap is eliminated, and perfect lubrication is maintained, the recess being oblong and its major axis substantially at right angles with the longitudinal axis of the piston.

3. The combination of an engine cylinder, of a piston having a beveled face intersecting the periphery of the inner end of the piston, a recess in said periphery spaced from said face, and a groove in said periphery extending from the beveled face to the recess, said face, recess, and groove being adapted to cooperate with the bore of the cylinder in forming a tapered oil-containing throat having a receiving mouth, an oil pocket, and a duct connecting the throat with the pocket, the arrangement being such that, during an inward stroke of the piston, oil on the cylinder bore is accumulated under pressure in the throat, forced through the duct, and trapped in the pocket to constitute a hydraulic cushion, whereby side slap is eliminated, the beveled face being inclined at approximately ten degrees with the periphery of the piston, the width of said face being such that the depth of said throat is greater than the width of the receiving mouth thereof.

4. The combination of an engine cylinder, of a piston having a beveled face intersecting the periphery of the inner end of the piston, a recess in said periphery spaced from said face, and a groove in said periphery extending from the beveled face to the recess, said face, recess, and groove being adapted to cooperate with the bore of the cylinder in forming a tapered oil-containing throat having a receiving mouth, an oil pocket, and a duct connecting the throat with the pocket, the arrangement being such that, during an inward stroke of the piston, oil on the cylinder bore is accumulated under pressure in the throat, forced through the duct, and trapped in the pocket to constitute a hydraulic cushion, whereby side slap is eliminated, said beveled face being interrupted by stops formed by portions of the periphery of the piston, whereby oil wiped from the cylinder by the piston is caused to flow through said groove into said recess.

In testimony whereof I have affixed my signature.

CARL B. DREVITSON.